(12) United States Patent
Chalabi et al.

(10) Patent No.: US 8,524,187 B2
(45) Date of Patent: Sep. 3, 2013

(54) THERMAL OXIDISERS, USING CONCENTRATED SUNLIGHT

(75) Inventors: Rifat Al Chalabi, Nottingham (GB); Ophneil Henry Perry, Nottingham (GB)

(73) Assignee: Chinook Sciences Limited, Nottinghamshire (GB)

( * ) Notice: Subject to any disclaimer, the term of this patent is extended or adjusted under 35 U.S.C. 154(b) by 0 days.

(21) Appl. No.: 13/575,014

(22) PCT Filed: Jan. 24, 2011

(86) PCT No.: PCT/GB2011/000082
§ 371 (c)(1),
(2), (4) Date: Sep. 4, 2012

(87) PCT Pub. No.: WO2011/092456
PCT Pub. Date: Aug. 4, 2011

(65) Prior Publication Data
US 2013/0053613 A1    Feb. 28, 2013

(30) Foreign Application Priority Data
Jan. 27, 2010    (GB) .................................. 1001292.0

(51) Int. Cl.
| B01D 53/72 | (2006.01) |
| B01D 53/74 | (2006.01) |
| B01D 53/76 | (2006.01) |
| A62D 3/10 | (2007.01) |
| C01B 3/22 | (2006.01) |

(52) U.S. Cl.
USPC ...................... 423/245.1; 423/245.3; 423/650; 422/168; 422/186; 422/187; 588/301; 588/306; 588/405; 252/373

(58) Field of Classification Search
USPC ................... 423/245.1, 245.3, 650; 422/168, 422/186, 187; 588/301, 306, 405; 252/373
See application file for complete search history.

(56) References Cited

U.S. PATENT DOCUMENTS

| 4,405,594 A | * | 9/1983 | Pyle ............................... 423/579 |
| 4,549,528 A | * | 10/1985 | Gibson .......................... 588/306 |
| 5,417,825 A | * | 5/1995 | Graham et al. ............. 204/158.2 |
| 5,698,829 A | * | 12/1997 | Ruddick et al. ........... 204/157.15 |
| 6,827,082 B1 | * | 12/2004 | Kogan et al. ................... 126/680 |
| 7,449,158 B2 | * | 11/2008 | Haueter et al. ................ 422/186 |
| 2005/0042152 A1 |  | 2/2005 | Gardner et al. |
| 2009/0136405 A1 | * | 5/2009 | Matsui et al. ............... 423/245.1 |
| 2011/0064638 A1 | * | 3/2011 | Molins ........................ 423/245.1 |
| 2011/0315542 A1 | * | 12/2011 | Ba-Abbad et al. .......... 204/157.6 |

* cited by examiner

*Primary Examiner* — Timothy Vanoy
(74) *Attorney, Agent, or Firm* — Stetina Brunda Garred & Brucker

(57) ABSTRACT

A VOC treatment apparatus is provided for treating substantially opaque VOCs and comprises a processing chamber (24) in which VOCs are treated; and a solar energy introducing device (8). The solar energy introducing device (8) comprises a tubular structure having a first end located external to the processing chamber (24) and having a first inlet (14) through which concentrated sunlight is received and a second inlet (16) through which a flow of substantially optically transmittant gas is received. The solar energy introducing device (8) has a second end (18) that opens into the processing chamber (24) and terminates in a nozzle providing an outlet for the substantially optically transmittant gas and the concentrated sunlight. In use the optically transmittant gas exits the second end of the device in a jet to create an optically transmittant zone in the substantially opaque VOCs within the processing chamber (24), in which zone the sunlight can travel.

23 Claims, 10 Drawing Sheets

THERMAL OXIDISERS, USING CONCENTRATED SUNLIGHT

The present application claims priority to International Application No. PCT/GB2011/000082 which was filed on Jan. 24, 2011, which claims priority to the Great Britain Patent Application No. 1001292.0 filed Jan. 27, 2010.

The present invention relates to improvements in thermal oxidisers, in particular to the use of sunlight as an energy source in the oxidation of volatile organic compounds (VOCs).

The treatment of VOCs to destroy them by a thermal oxidation process is well known. Typically it is known to heat VOCs to a temperature in excess of 750° C. and maintain them at that temperature for a residence time of at least two seconds in the presence of sufficient oxidant for complete combustion to occur.

Alternatively, VOCs may be heated in the absence of oxygen with a residence time of no less than 2 seconds to break down the VOC molecules into a synthesis gas (Syngas) of predominately small molecular species such as H2, CO, CO2, and H2O. This process is also known as thermal decomposition.

It has been proposed that solar energy can be used to, at least in part, supply the necessary heat for the treatment of VOCs. However, a number of practical problems are presented when using energy from sunlight to heat a volume of VOCs.

VOCs are an opaque gas an as such are not substantially penetrated by sunlight. The result of this is that if concentrated sunlight is directed into a reservoir of VOCs, only the gasses adjacent the point of entry of the sunlight are heated. Concentrated sunlight produces an intense but concentrated form of heat and, as such, if used to heat VOCs the sunlight's inability to penetrate the VOCs results in localised heating and hotspot occur.

As stated above, for the VOCs to oxidise it is required that they be maintained at their elevated temperature for a minimum residence time. In a system having a large chamber in which the VOCs are treated this generally means that the entire contents of the chamber must be maintained at a minimum temperature. In a system that is susceptible to hotspots, if the correct amount of energy is input to maintain the entire contents at the minimum desired temperature, although the average temperature and residence time may satisfy the oxidation requirements the presence of hotspots results in areas of the treatment chamber having a temperature below the minimum required temperature, i.e. there is a very uneven temperature distribution. This type of problem is typically overcome by an excess energy being used to ensure a minimum maintained temperature throughout the treatment area to achieve full oxidation. As such the use of sunlight can be an unreliable means of providing heat for the treatment of VOCs and its efficiency is not maximised.

Furthermore, where VOCs are thermally heated without burning them and syngas is produced, it is desirable to heat the syngas to a higher temperature, typically in excess of 1000° C. so as to break down long chain hydrocarbon molecules, for example tar, in the syngas. This is typically done in the same chamber utilizing a heating system that would not oxidize the VOCs. In this case the problem is even bigger since the VOCs (large and small molecules) are substantially opaque; hence the concentrated sunlight cannot penetrate at all. Accordingly the use of concentrated sunlight to provide the energy to heat the syngas suffers from the same problems as associated with the use of concentrated sunlight in the use of treating VOCs.

The present invention provides an apparatus and method for improved use of concentrated sunlight for the treatment of VOCs.

According to a first aspect of the invention there is provided a VOC treatment apparatus for treating substantially opaque VOCs comprising: a processing chamber in which VOCs are treated; and a solar energy introducing device comprising a tubular structure having: a first end located external to the processing chamber and having a first inlet through which concentrated sunlight is received and a second inlet through which a flow of substantially optically transmittant gas is received; and a second end that opens into the processing chamber and terminates in a nozzle providing an outlet for the substantially optically transmittant gas and the concentrated sunlight; wherein, in use, the optically transmittant gas exits the second end of the device in a jet to create an optically transmittant zone in the substantially opaque VOC's within the processing chamber, in which zone the sunlight can travel.

By providing a flow of substantially optically transmittant gas into the VOCs, creates a zone in a treatment apparatus, which in use would be full of substantially optically opaque VOCs, through which the concentrated sunlight can enter the apparatus. The energy from the sunlight can therefore penetrate the VOCs to a greater depth.

In addition, towards the end of the jet of substantially optically transmittant gas entering the apparatus, the substantially optically transmittant gas will start to mix with the VOCs over a distance, i.e. the flow of substantially optically transmittant gas will become gradually more dilute. The result of this is that instead of all the energy from the sunlight being deposited into the VOCs in a small area, as would be the case where there was no gradual dilution of VOCs, the energy can be deposited into the VOCs over a larger area.

In a preferred arrangement the VOC treatment apparatus further comprises a control means adapted to control the velocity of the substantially optically transmittant gas as it exits the nozzle so as to vary the depth of the optically transmittant zone within the VOC's, and therefore the penetration of the concentrated sunlight, into the VOCs.

By controlling the velocity of the substantially optically transmittant gas the depth to which they will penetrate the VOCs, to create an optical passageway for the sunlight, can be varied. In this manner the energy from the sunlight can be delivered into the VOCs at different penetration depths.

Preferably the treatment apparatus further comprises: an electrical control unit for controlling the means for controlling the velocity of the substantially optically transmittant gas so as to maintain the contents of the thermal oxidiser in excess of 750°.

As a residency time of two seconds is required at over 750° C. to destroy the VOCs then local variations in temperature can affect the efficiency of the treatment. By varying the speed and therefore the penetration depth of the solar energy localised heating can be provided in different areas of the treatment chamber to minimise or eliminate localised cool spots of below 750° C.

In one preferred arrangement the controller cyclically increases and decreases the velocity of the substantially optically transmittant gas such that the penetration of the concentrated sunlight into the VOCs cyclically increases and decreases. In this way a "hot zone" where the energy from the concentrated sunlight is being delivered can sweep different depths of the processing chamber hence depositing energy along the height of the processing chamber.

Furthermore, by extending the depth of the concentrated sunlight, the surface area of the sunlight column increases by virtue of increasing the length of the sunlight column.

The increase in the surface area significantly increases the heat transferred from the much hotter transmittant gas inside the sunlight column into the processing chamber as it enables a greater amount of heat radiation transfer to occur, given by the equation:

$$P=e\sigma A(T^4-T_c^4)$$

where: P=net radiated power; e=emissivity; σ=Stefan's constant; A=radiating area; T=temperature of solar column; and $T_c$=Temperature within thermal oxidiser. As the heat transfer due to radiation is proportional to the forth power of the temperature difference, increasing this radiation significantly increases the amount of heat transferred to the processing chamber In an alternative preferred embodiment the apparatus may comprise: a plurality of sensors for outputting signals indicative of the local temperature at different locations in the processing chamber; and wherein the control unit receives signals from the sensors and controls the velocity of the substantially optically transmittant gas in response to the signals so the concentrated sunlight penetrates the processing chamber to a required depth to provide localised heating therein. In this way a closed loop feedback can be provided that measures localised temperatures within the processing chamber and the energy from the concentrated sunlight can then be directed in response to the measured temperatures to preferably ensure a substantially constant temperature throughout the processing chamber but, at a minimum, ensure that no areas of the processing chamber fall below 750° C.

In one arrangement the VOC treatment apparatus may comprises a thermal oxidiser and the VOCs are fully combusted in the VOC treatment apparatus in the presence of oxygen. In such an arrangement VOCs exiting each nozzle may be combusted and each nozzle may comprise a burner.

In an alternative arrangement the apparatus may comprise a gasifier and the VOCs are heated in the absence of oxygen to produce CO and $H_2$ filled syngas.

The apparatus may further comprise: a syngas outlet; a syngas engine for converting syngas into electrical energy; and a syngas engine exhaust recirculation conduit connected to the syngas engine exhaust outlet and the inlet for a substantially optically transmittant gas of the solar energy introducing device; and wherein the exhaust gas from the syngas engine comprises the substantially optically transmittant gas In one arrangement the apparatus further comprises: an exhaust gas outlet for post combustion gas; a recirculation conduit to feed post combustion gas to the substantially optically transmittant gas inlet of the solar energy introducing device; wherein the post combustion gas comprises the substantially optically transmittant gas.

At least a portion of the exhaust post combustion gasses are re-circulated within the system. As the exhaust gasses of the syngas engine will comprise large percentage of $CO_2$ and $H_2O$ which has a relatively high thermal capacity, in such an embodiment the exhaust gas will become heated even to a higher degree as a result of the sunlight beam as it passes through the device and will act as a further heat transfer mechanism between the concentrated sunlight and the VOCs. In this scenario the heat transfer will benefit from the $CO_2$ and $H_2O$ optical and thermal properties, and hence the sunlight column will carry higher energy from the sun, and provide an even higher enhanced heat transfer to the rest of the processing chamber In a preferred arrangement the nozzle comprises a common central flow path for concentrated sunlight and substantially optically transmittant gas and a concentric flow path surrounding the central flow path for carrying, in use, a flow of VOC. Optionally a further concentric flow path may surrounded the VOC flow path and, in use, carry a flow of oxidant.

In this manner as the VOCs entering the apparatus do so immediately in the vicinity of the concentrated sunlight, heat transfer into the VOCs entering the apparatus can be quickly heated. Furthermore, during hours where there is insufficient sunlight for concentrated sunlight heating to be effective, the nozzle can be used to combust the VOCs and oxidant in a standard manner without the assistance of sunlight.

In a preferred arrangement the inlet for concentrated sunlight comprises a lens to alter the direction of the light impinging upon it to create parallel light. In this manner the strength of the concentrated sunlight is substantially independent upon the distance from its inlet and therefore the heating characteristics will remain substantially constant independent on the depth of penetration of the sunlight into the VOCs.

In one preferred embodiment the control means comprises a flow control valve for controlling the velocity of the optically transmittant gas.

In an alternative preferred embodiment the length of the tubular structure is variable and the control means comprises varying the length of the tubular structure to, in use, increase or decrease the residency time of substantially optically transmittant gas passing therethrough to control the temperature, and therefore the expansion, of the gas therein so as to accelerate it to a greater or lesser extent as it passes therethrough and exits the nozzle.

In this way the energy from the sunlight itself can be used to accelerate the substantially optically transmittant gas.

In a further preferred embodiment the control means may comprise a variable geometry nozzle wherein changing the nozzle geometry causes gasses passing therethrough to accelerate to a greater or lesser extent.

According to a second aspect of the invention there is provided a method for treating substantially opaque VOCs comprising: containing VOCs in a VOC processing chamber; introducing a jet of substantially optically transmittant gas into the VOC processing chamber through a nozzle to create a substantially optically transmittant path therein; and introducing concentrated sunlight into the processing chamber concentrically with the jet of substantially optically transmittant gas via the same nozzle so as to raise the temperature of the VOCs therein.

The method may further comprise: varying the velocity of the substantially optically transmittant gas entering the processing chamber so as to vary the depth of penetration of the substantially optically transmittant path, and therefore the penetration of the concentrated sunlight, into the VOCs.

A preferred method includes: obtaining electrical signals indicative of the temperature at various locations within the processing chamber; processing said electrical signals to determine which areas of the processing chamber need solar energy to raise their temperature; and controlling the velocity of the substantially optically transmittant gas to deliver solar energy to the areas in need of solar energy.

The method may include introducing sufficient oxidant into the processing chamber to effect full thermal oxidation of the VOCs therein. Alternatively it may include depleting the oxygen in the atmosphere of the processing chamber so as to effect thermal decomposition of the VOCs therein such that the VOCs are substantially thermally decomposed into smaller molecules to produce a largely CO and $H_2$ filled syngas. This CO and $H_2$ containing syngas can be extracted from the processing chamber and used to power an engine and the post combustion exhaust gas from the syngas engine (largely then combusted, and composed primarily of $CO_2$ and H$_2$O) can be re-circulated and introduced into the VOC processing chamber as the substantially optically transmittant gas.

The method may comprise introducing a substantially opaque media into the substantially optically transmittant gas so as to reduce the depth of penetration of the concentrated sunlight into the processing chamber. In some circumstances the signals from the combustion chamber may require the sunlight to deposit less energy in the depth of the processing chamber and more energy in the upper part of the processing chamber and to achieve that, the optically transmittant gas needs to have a reduced transmittancy so as to force the sun energy beam to deposit its energy closer to the top of the chamber. This is achieved by introducing an at least partially opaque substance into the optically transmittant gas (example ash, non burner VOC, etc.). This would add the additional flexibility to the control of the device.

In particular, such a system may be needed when the processing chamber is processing VOCs form a batch processing system wherein the VOC output varies over time. At times when less VOCs are being produced the opacity of the gas in the processing chamber will be less (due to the lower percentage content of opaque VOCs) and an increase in the opacity of the optically transmittant gas along the path of entry of the concentrated sunlight prevents the sunlight penetrating to, and possibly damaging, the lower surface of the processing chamber.

In another arrangement reflective particles or gas (for example aluminium dust, or other metal dust) is introduced into the substantially optically transmittant gas so as to reflect the solar energy within the processing chamber.

Such a method enables the sunlight to disperse its energy more radially, and away from, the concentrated sunlight beams, and therefore can achieve amore uniform heat dispersion throughout the processing chamber. The reflective particles or gas reflect the sunlight from the concentrated beam to other parts of the combustion chamber, hence achieving better temperature uniformity inside the processing chamber.

According to a third aspect of the invention there is provided a method for treating substantially opaque VOCs comprising: containing VOCs in a VOC processing chamber; introducing a jet of substantially optically transmittant gas into the VOC processing chamber through a nozzle to create a substantially optically transmittant path therein; and introducing concentrated sunlight into the processing chamber concentrically with the jet of substantially optically transmittant gas via the same nozzle so as to raise the temperature of the VOCs therein.

Specific embodiments of the invention will now be described, by way of example, with reference to the drawings in which.

Figure 1:
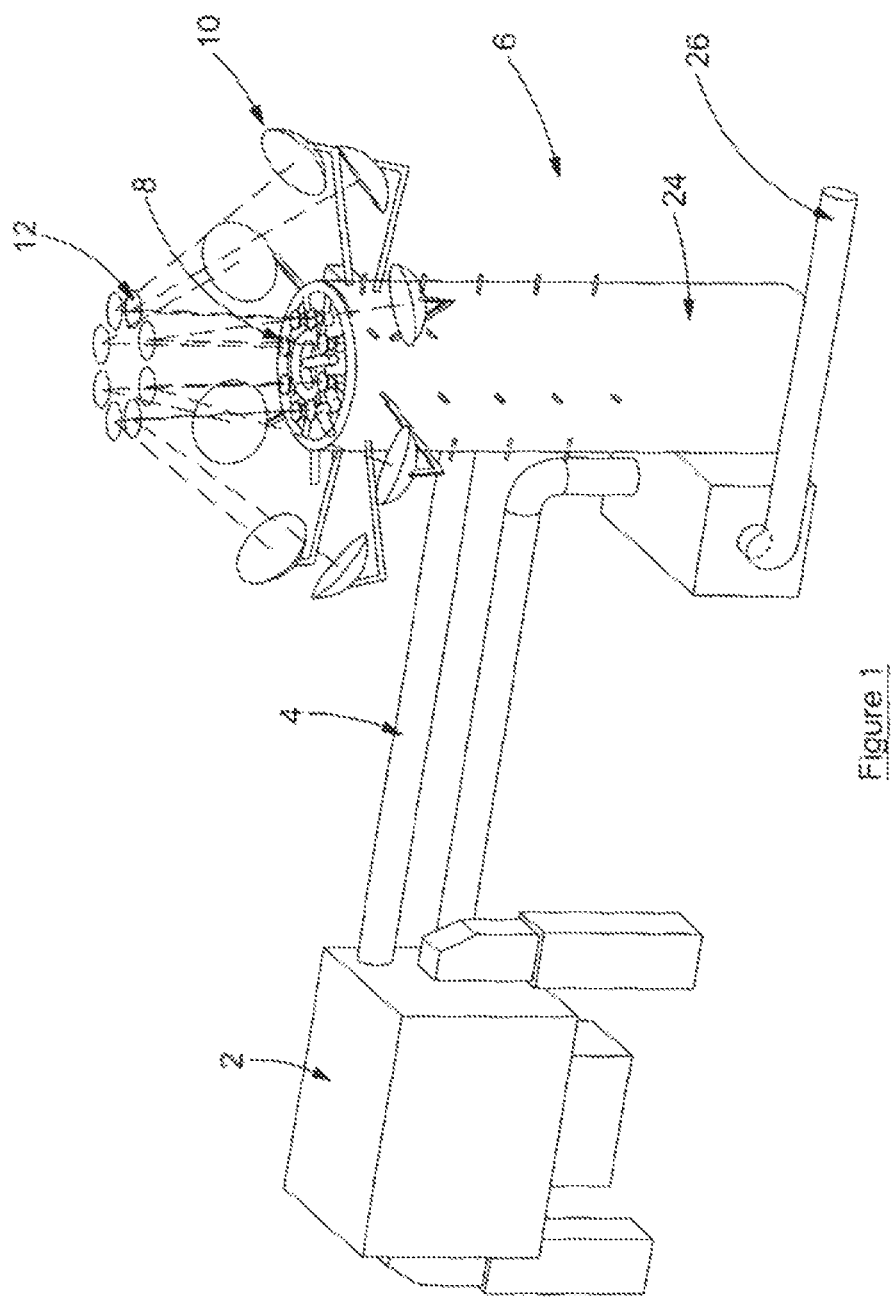
FIG. 1 shows a perspective view of a waste processing system having a VOC treatment apparatus according to the invention.
Figure 2:
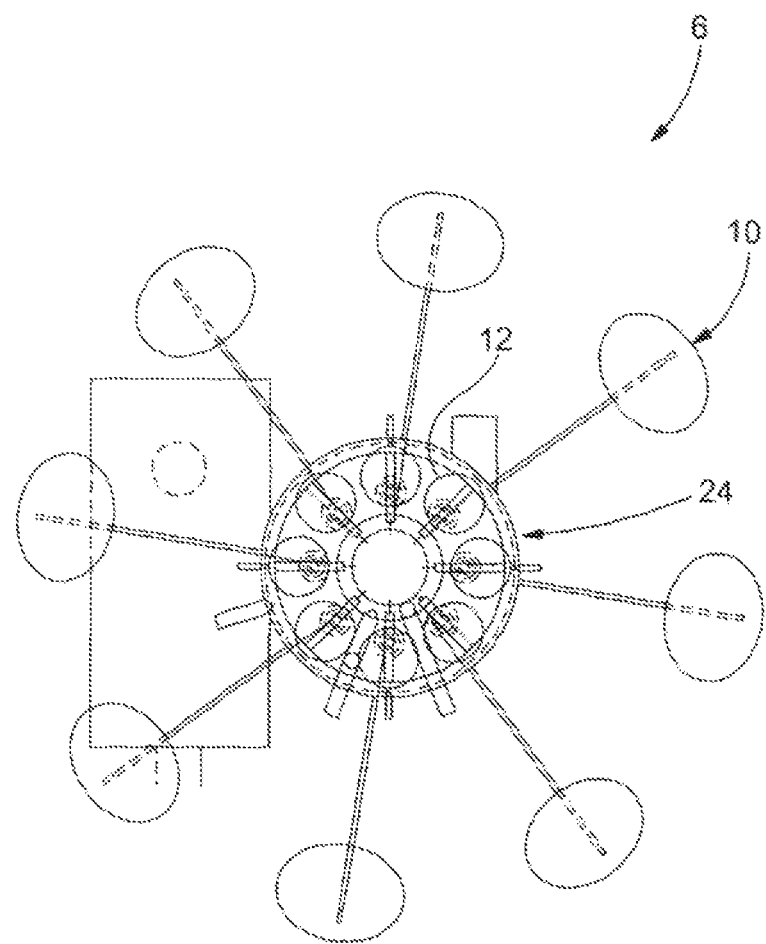
FIG. 2 shows a top view of the VOC treatment apparatus of FIG. 1.
Figure 3:
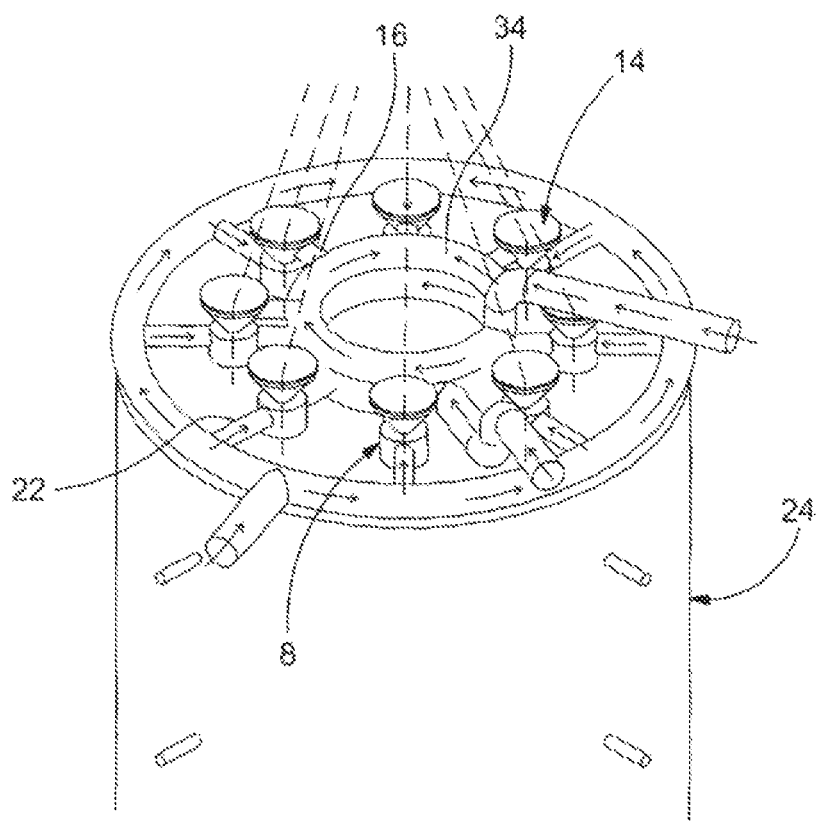
FIG. 3 shows a close up view of the top of the VOC treatment apparatus of FIG. 1.

Referring to FIGS. 1 to 3 a waste processing system is shown comprising a waste processor 2 in which such materials as organically coated waste and organic materials including biomass, industrial waste, municipal solid waste and sludge are processed by pyrolysis, for example as described in European Patent Application Number EP1875146. The pyrolysis of the waste material produces hot gasses containing VOCs which must be treated. The VOCs exit the processor 2 via an outlet conduit 4 and are directed to a VOC treatment apparatus 6. The VOC treatment apparatus 6 comprises a substantially cylindrical processing chamber 24 in which VOCs are treated by combustion or gasification. Located in the top of the processing chamber is a plurality of solar energy introducing devices 8. Parabolic reflectors 10 collect and concentrate sunlight onto mirrors 12 that in turn reflect the concentrated sunlight into the solar energy introducing devices 8.

The solar energy introducing devices 8 receive concentrated sunlight through inlets 14 at one end thereof. The inlets 14 are lenses that receive the sunlight from the concentrators 10 and mirrors 12 and alter the path of the light to create parallel light in the devices 8. Alternatively it will be appreciated that the mirrors 12 can be designed with an appropriate contour such that the light reflected therefrom is parallel and the inlets 14 could comprise transparent material. Alternatively the mirror and inlet arrangement may be dimensioned such that the concentrated sunlight has a slightly converging focal path. Due to the high temperatures associated with the concentrated sunlight it will be appreciated that localised cooling may be needed in the vicinity of the inlets to maintain the materials at a temperature at which they are structurally and/or optically sound.

The inlets 14 may have shut off means (omitted for clarity) to prevent the concentrated sunlight from entering them, e.g. they may have removable covers. Alternatively, and preferably, the parabolic reflectors 10 are mounted on motorised mounts and when heating from the sunlight is not required the parabolic reflectors 10 are moved to a position in which they do not reflect sunlight onto the mirrors 12.

Figure 4:
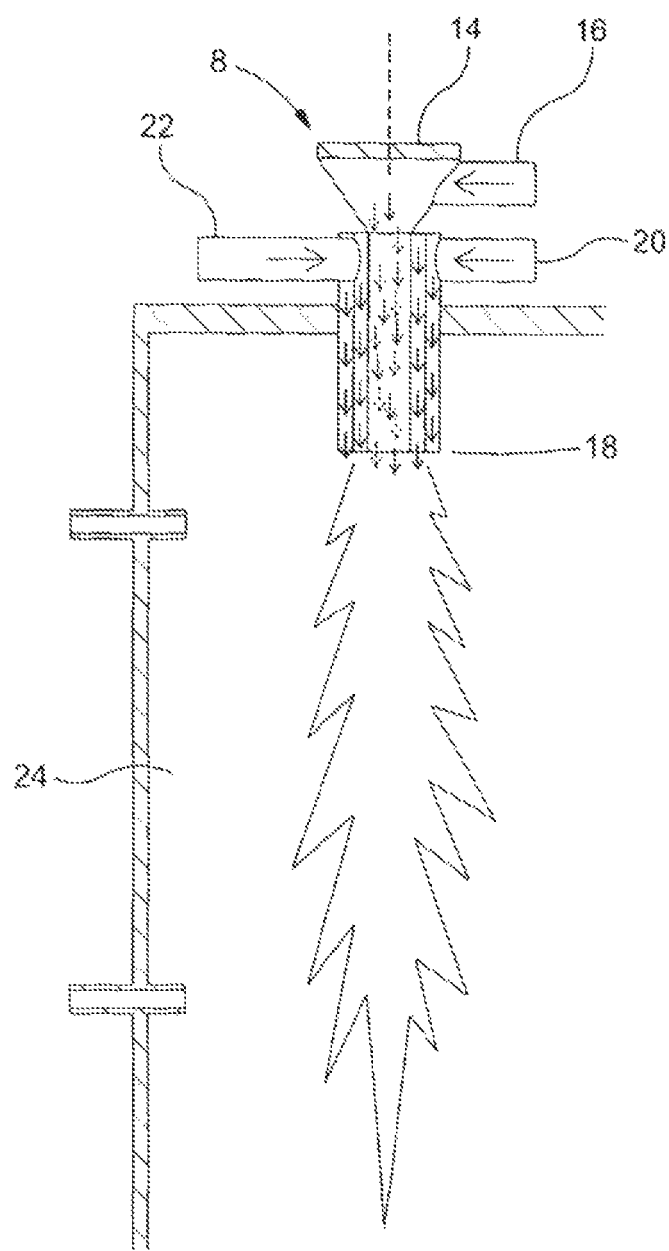
FIG. 4 shows a part section view through a VOC treatment apparatus in accordance with the invention.

Referring specifically to FIGS. 3 and 4 the basic operation of the devices is as follows. The devices 8 have an inlet 16 that is connected to a supply 34 of substantially optically transmittant gas. The devices 8 have two further inlets 20, 22 connected to a supply of oxidant and VOCs respectively. The supply of VOCs is connected to the outlet conduit 4 of the waste processor 2 (FIG. 1).

Referring to FIG. 4 each device 8 comprises a central tubular conduit through which the substantially optically transmittant gas passes. The substantially optically transmittant gas exits the end of the nozzle 18 in a jet and clears a pathway through the VOCs in the processing chamber 24 of the treatment apparatus, which are opaque. The device has a transparent top surface which acts as an inlet 14 for the concentrated sunlight which passes through the device and exits the nozzle 18 in alignment with the jet of substantially optically transmittant gas. As the jet clears a pathway in the opaque VOCs the sunlight can penetrate the VOCs to a depth determined by the force of the jet. VOCs and oxidants pass through outer concentric conduits and through the nozzle 18 to enter the processing chamber 24. The flow rates of the substantially optically transmittant gas, VOCs and oxidant can be varied dependant on the required reaction within the apparatus.

Figure 7:
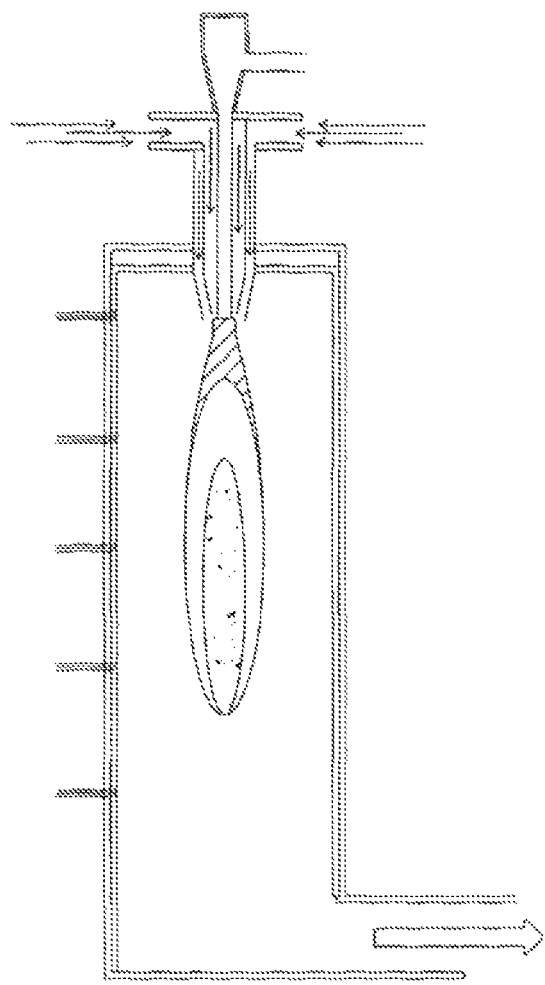
FIG. 7 shows the device in a first mode of operation.

The VOCs and the oxidant exiting the nozzle concentrically around the optically transmittant gas also act to shroud the jet of optically transmittant gas from mixing turbulently with the contents of the processing chamber. This enables the optically transmittant gas, and therefore the concentrated sunlight, to penetrate further into the chamber than would be the case without the concentric flows. In a first mode of operation, shown in FIG. 7, where insufficient sunlight is present to supply the required heat no substantially optically transmittant gas is needed and only a flow of VOCs and oxidant is required. In one mode of operation the VOCs are burned in a flame in the presence of oxygen to fully combust and be maintained in excess of 750° C. for a minimum period of two seconds thereby destroying the VOCs. Part of the exhaust gas from the processing chamber is re-circulated back into the waste processor 2 and the remainder of the hot exhaust gasses exit via outlet conduit (26, FIG. 1) and are used to produce steam that in turn generates power, e.g. by driving a steam turbine. In this manner when there is insufficient sunlight the apparatus can be used in a conventional manner to thermally oxidise the VOCs by complete combustion. As with conventional systems a fuel, for example natural gas, burner may also be employed to initially raise the temperature of the chamber to the combustion temperature and thereafter only used if the heat produced by the volume of VOCs being combusted is not sufficient to maintain the temperature in the processing chamber 24 at the required level. This may for example be required if the waste processor 2 is a batch processing device wherein the level of VOCs produced is not constant throughout the process.

Alternatively, in the absence of sunlight, a fuel burner (not shown) may be incorporated into the processing chamber. The fuel burner may be provided with fuel and oxidant in a stoichiometric ratio, or may burn oxygen and natural gas, or air and natural gas wherein the oxidant is present only in sufficient quantities for the combustion of the natural gas. In this manner the VOCs are heated in an environment where there is no oxygen for their combustion hence the VOCs are thermally decomposed into smaller molecular species with predominately $CO$, $H_2$, $CO_2$, and $H_2O$ to produce syngas in a known manner.

Figure 8:
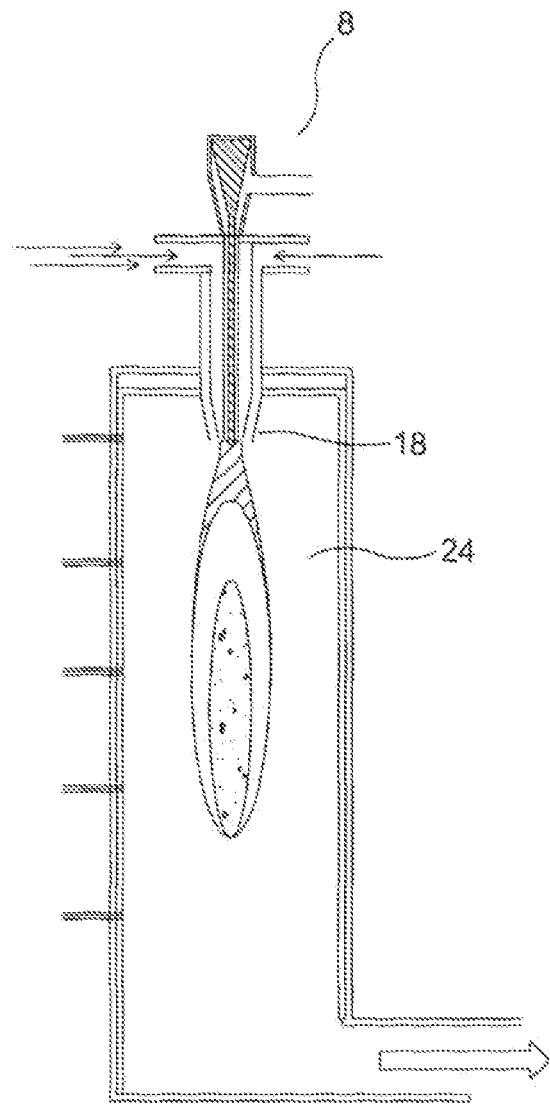
FIG. 8 shows the device in a second mode of operation.

In a second mode of operation, shown in FIG. 8, concentrated sunlight is allowed to enter the device 8 and exit via the nozzle 18 into the processing chamber 24. The flow of substantially optically transmittant gas is off and therefore the concentrated sunlight does not substantially penetrate the VOCs but provides high localised heating at the point of entry of the VOCs and the oxidant. In this manner the heat of the concentrated sunlight is used to heat the VOCs to their combustion temperature in the presence of sufficient oxygen for complete combustion. This reduces and/or removes the need for any additional type of fuel burner to initiate the combustion or raise the temperature of the VOCs to their combustion temperature when the heat provided by the combustion of the VOCs alone is not sufficient.

Figures 9, 10:
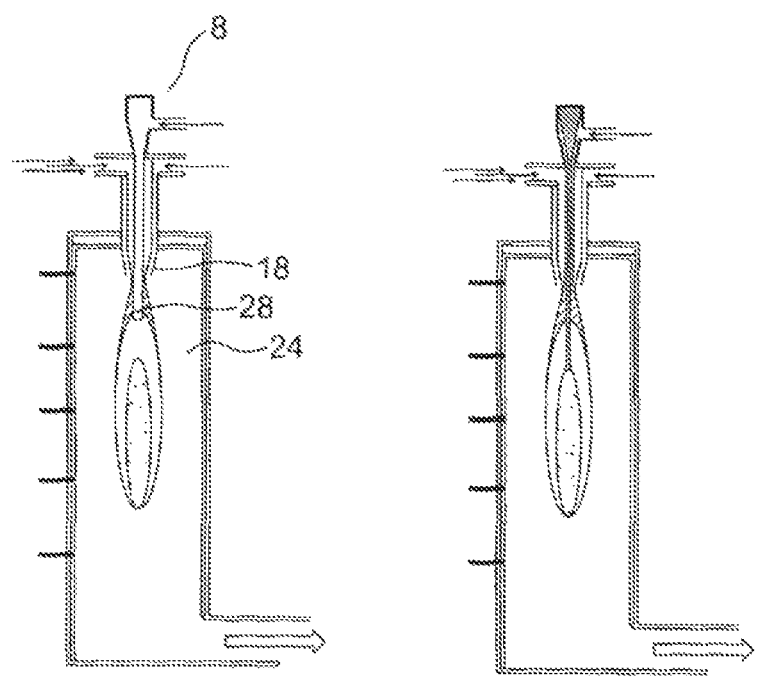
FIGS. 9 and 10 show the device in a third mode of operation.

In a third mode of operation shown in FIGS. 9 and 10 the flow of substantially optically transmittant gas is turned on, which, as shown in FIG. 9 exits the nozzle 18 in a jet 28 that displaces any VOCs to create a substantially optically transmittant path.

FIG. 10 shows that the concentrated sunlight has been directed into the device 8 and passes therethrough, exiting the nozzle and passing through the optically transmittant path to heat the VOCs further into the processing chamber 24. As the optically transmittant gas passes through the device it becomes quickly heated by the concentrated sunlight and expands. As the sideways expansion of the gas is prevented by the conduit it expands longitudinally, accelerating as it does so in the central conduit, thereby exiting the jet at a faster speed than it would do without the presence of the sunlight. Accordingly, when heated by the sunlight the jet of optically transmittant gas penetrates further into the VOCs (FIG. 10) than when sunlight is not present (FIG. 9).

This relative quantity of oxidant and VOCs entering the processing chamber through inlets 20 and 22 can be varied such that the VOC treatment may occur in an environment with sufficient oxidant to effect complete thermal oxidation, or the VOC treatment may be conducted in a reduced oxygen environment to thermally decompose the VOCs to produce small molecule species syngas in the processing chamber. In the second of these the temperature of the processing chamber 24 may be maintained at a higher temperature, typically in excess of 1000° C. so as to break down any long chain hydrocarbons, e.g. tars etc, present in the syngas.

Where syngas is produced it may exit the processing chamber 24 via outlet 26 and be used to power a syngas engine to produce electricity.

Figure 5:
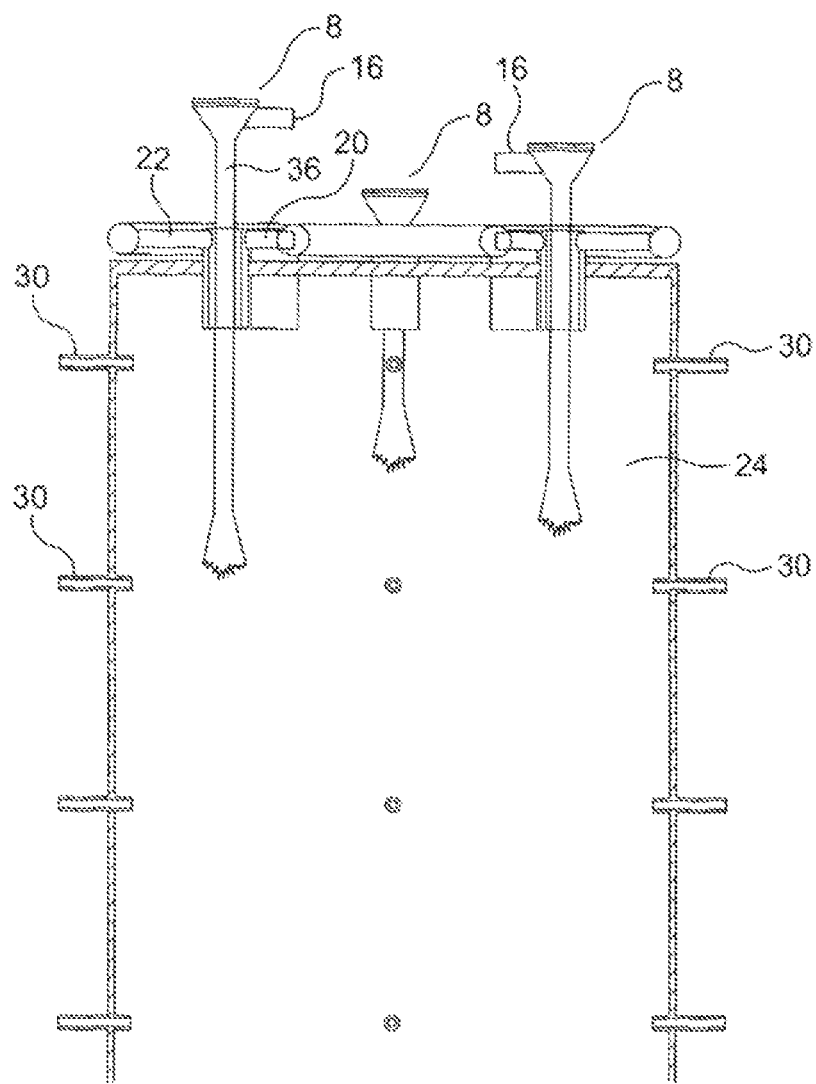
FIG. 5 shows a section view through VOC processing chamber in accordance with the invention with a number of multiple solar energy introducing devices.
Figure 6:
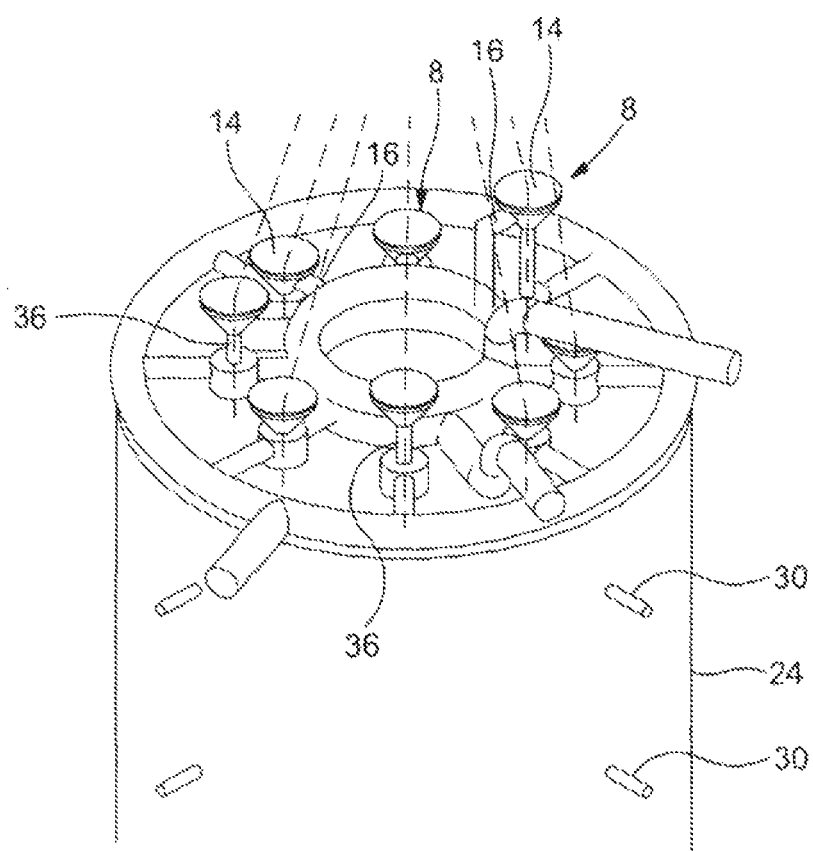
FIG. 6 shows a close up perspective view of the top of a VOC processing chamber with top view of all the VOC treatment apparatus showing variable length structures.

Referring now to FIGS. 5 and 6 the top of a VOC treatment apparatus is shown having a plurality of devices 8 located therein. The devices 8 operate as described above. As can be seen from FIG. 5 the central tubular conduit 36 of each device 8 can be extended so as to increase its length. This is achieved by known means, for example the use of telescopic sections. The conduit that feeds the substantially optically transmittant gas to the inlet 16 will in this case need to be a flexible conduit, or to have other means for providing movement, as the of optically transmittant gas inlet 16 will move depending on the extent of extension of the central tubular conduit.

Figure 11:
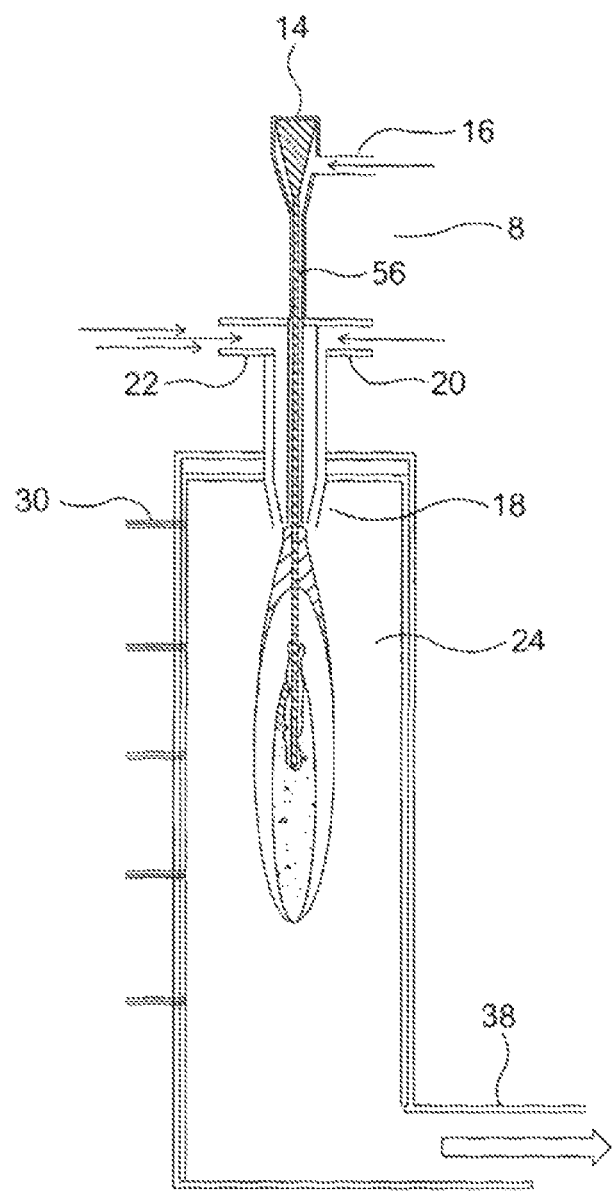
FIG. 11 shows the device in a forth mode of operation.

As the extension of the central tubular conduit 36 lengthens the section of conduit through which the optically transmittant gas passes, the residency time for which the optically transmittant gas is in contact with the concentrated sunlight, and therefore the amount of time for which the optically transmittant gas is heated by the concentrated sunlight, increases. The effect of the additional heating of the optically transmittant gas is that it expands to a greater extent, therefore accelerating and exiting the nozzle 18 at a higher velocity and penetrating the VOCs in the processing chamber 24 to a greater depth (FIG. 11). In this manner the depth of penetration of the optically transmittant gas, and therefore the depth of penetration of concentrated sunlight from each device 8, into the VOCs can be controlled by lengthening or shortening the central tubular conduit 36 of each device 8.

The telescopic movement of the central tubular conduit is driven by a motorised mechanism connected to a controller to enable electronic control of the penetration of each device 8.

The processing chamber 24 has a plurality of temperature sensors 30 at various positions around it and at various depths. The sensors sense the temperature of the contents of the processing chamber 24 and send signals indicative of the temperature to a controller (not shown) that is used to control the devices.

In one mode of operation the controller controls the telescopic sections to cyclically extend and retract such that the penetration depth of the sunlight cycles up and down in the processing chamber in a sweeping motion so as to distribute the energy from the concentrated sunlight evenly into the VOCs at different depths in the processing chamber 24. The plurality of devices 8 may be controlled together in a synchronised manner or may be controlled out of synchronisation with each other such that when one of the devices 8 is heating the VOCs at one depth, the other devices 8 are heating VOCs at other depths.

In a second mode of operation the controller receives signals from the temperature sensors 30 and controls the extension or retraction of the devices 8 in response to the sensed temperatures so as to deliver the energy from the concentrated sunlight to the required area of the processing chamber 24. In this manner a closed loop control system is enabled that controls the local delivery of heat to the required area of the processing chamber. This mode of operation enables a very effective use of the available energy because, as the temperature is controlled locally and the heat delivered locally, this operation reduces or even eliminates the need to overheat some areas to avoid cold spots in other area, and hence, the processing chamber 24 can be kept at the minimum required temperature to maintain target-heating temperature.

Although the above operation is described in relation to the use of varying the central conduit length to control the penetration depth of the sunlight the same control methods can, of course, be used in combination with the other methods of controlling the penetration depth of the optically transmittant gas, for example varying the flow rate of the optically transmittant gas or the use of a variable geometry nozzle.

The substantially optically transmittant gas may be any suitable gas, for example it may be an oxidant gas, e.g. air, or an inert gas, for example nitrogen. Alternatively, when, as described above, the processing chamber produces syngas that is burned in a syngas engine, the post combustion exhaust gas from the syngas engine may be used as the substantially optically transmittant gas. As the exhaust will contain a higher concentration of $CO_2$ and $H_2O$ than, for example, air, and as $CO_2$ and $H_2O$ have a high heat capacity, when they becomes heated in the conduit by the concentrated sunlight they will act as a more effective heat transfer conduit to carry the heat from the sunlight into the processing chamber atmosphere 24 and the VOCs.

In the above methods of operation, where the VOCs are treated by complete combustion the hot exhaust gas from the complete combustion exits the processing chamber 24 and can be used as a heat source for various applications but preferably is used to heat water to produce steam to drive a steam generator. In this way electrical energy can be recovered from the processed waste.

The invention claimed is:

1. A VOC treatment apparatus for treating substantially opaque VOCs comprising:
    a processing chamber in which VOCs are treated;
    a solar introducer having a tubular structure having, the tubular structure having a first end located externally of said processing chamber and having a first inlet configured to receive concentrated sunlight therethrough and a second inlet configured to receive a flow of substantially optically transmittant gas said tubular structure further having a second end that opens into said processing chamber and terminating in a nozzle, said nozzle providing an outlet for said substantially optically transmittant gas and said concentrated sunlight, said nozzle configured to create a jet of said optically transmittant gas to form an optically transmittant zone in the substantially opaque VOC's within the processing chamber, in which zone said sunlight can travel: and
    a controller configured to control the velocity of said substantially optically transmittant gas as it exits said nozzle so as to vary the depth of the optically transmittant zone within the VOC's and therefore the penetration of the concentrated sunlight, into the VOCs.

2. A VOC treatment apparatus according to claim 1 wherein the controller further comprises an electrical controller configured to control the velocity of the substantially optically transmittant gas so as to maintain the contents of the thermal oxidiser in excess of 750°.

3. A VOC treatment apparatus according to claim 2 wherein the electrical controller is configured to cyclically increase and decrease the velocity of the substantially optically transmittant gas so as to cyclically increase and decrease the penetration of the concentrated sunlight into the VOCs.

4. A VOC treatment apparatus according to claim 2 further comprising:
    a plurality of sensors located at different locations in the processing chamber and configured to output signals inactive of the local temperature at each location; and
    wherein the controller receives said signals from said sensors and is configured to control the velocity of the substantially optically transmittant gas in response to said signals to deliver said concentrated sunlight to a required depth to provide localised heating.

5. A VOC treatment apparatus according to claim 1 wherein the VOC treatment apparatus further comprises a thermal oxidiser configured to fully combust the VOCs in the presence of oxygen.

6. A VOC treatment apparatus according to claim 5 wherein said nozzle comprises a burner nozzle and VOCs are combusted as they exit each nozzle.

7. A VOC treatment apparatus according claim 1 wherein the VOC treatment apparatus further comprises a gassifier configured to heat VOCs in the absence of oxygen to produce CO and $H_2$ filled syngas.

8. A VOC treatment apparatus according to claim 7 further comprising:
    a syngas outlet;
    a syngas engine configured to conveying syngas into electrical energy; and
    a syngas engine exhaust recirculation conduit connected to an exhaust outlet of the syngas engine and to said second inlet; and
    wherein the exhaust gas from the syngas engine comprises said substantially optically transmittant gas.

9. A VOC treatment apparatus according to claim 1 further comprising:
    an exhaust gas outlet for post combustion gas;
    a recirculation conduit extending between said exhaust gas outlet and said second inlet; wherein
    the post combustion gas comprises the substantially optically transmittant gas.

10. A VOC treatment apparatus according to claim 1 wherein said nozzle comprises a common central flow path for concentrated sunlight and substantially optically transmittant gas: and a VOC inlet flow path, said VOC inlet flow path configured as a first concentric flow path surrounding said central flow.

11. A VOC treatment apparatus according to claim 10 further comprising an oxidant inlet flow path configured as a second concentric flow path surrounding said VOC inlet flow-path.

12. A VOC treatment apparatus according to claim 1 wherein said first inlet comprises a lens configured to alter the direction of light impinging upon it to create parallel light in said tubular structure.

13. A VOC treatment apparatus according to claim 1 wherein the controller comprises a flow control valve configured to control the velocity of the optically transmittant gas.

14. A VOC treatment apparatus according to claim 1 wherein the controller is configured to vary the length of said tubular structure so as to increase or decrease the residency time of Sa id substantially optically transmittant gas passing therethrough thereby to control the temperature, and therefore the expansion, of the gas therein so as to accelerate it to a greater or lesser extent as it passes therethrough and exits the nozzle.

15. A VOC treatment apparatus according to claim 1 wherein said controller is configured to vary the geometry of said nozzle such that changing the nozzle geometry causes gasses passing therethrough to accelerate to a greater or lesser extent.

16. A method for treating substantially opaque VOCs comprising:
    containing VOCs in a VOC processing chamber;
    introducing a jet of substantially optically transmittant gas into the VOC processing chamber through a nozzle to create a substantially optically transmittant path therein: and
    introducing concentrated sunlight into the processing chamber concentrically with the jet of substantially optically transmittant gas via the same nozzle so as to raise the temperature of the VOCs therein.

17. The method according to claim 16 further comprising:
    varying the velocity of the substantially optically transmittant gas entering the processing chamber so as to vary the depth of penetration of the substantially optically transmittant path, and therefore the penetration of the concentrated sunlight, into the VOCs.

18. The method according to claim 17 wherein the method further includes:
    obtaining electrical signals indicative of the temperature at various locations within the processing chamber;
    processing said electrical signals to determine which areas of the processing chamber need solar energy to raise their temperature; and
    controlling the velocity of the substantially optically transmittant to deliver solar energy to the areas in need of solar energy.

19. The method according to claim 16 wherein the method further includes:
    introducing sufficient oxidant into the processing chamber to effect full thermal oxidation of the VOCs therein.

20. The method according to claim 16 wherein the method further includes:
    depleting the oxygen in the atmosphere of the processing chamber so as to effect thermal decomposition of the VOCs therein such that the VOCs are substantially thermally decomposed into smaller molecules to produce a largely CO and $H_2$ filled syngas.

21. The method according to claim 20 wherein the method further includes:
    extracting syngas from the processing chamber and using it to power an engine: and
    introducing the post combustion exhaust gas from the syngas engine into the VOC processing chamber as the substantially optically transmittant gas.

22. The method according to claim 16 further comprising the step of:
    introducing a substantially opaque media into the substantially optically transmittant gas so as to reduce the depth of penetration of the concentrated sunlight into the processing chamber.

23. The method according to claim 16 further comprising, the step of:
    introducing reflective particles into the substantially optically transmittant gas so as to reflect the solar energy within the processing chamber.

* * * * *